Oct. 8, 1963 D. K. BAKER 3,106,280
TRANSFER OF ARTICLES BETWEEN MOVING CONVEYOR MEANS
Filed Dec. 2, 1959 2 Sheets-Sheet 1
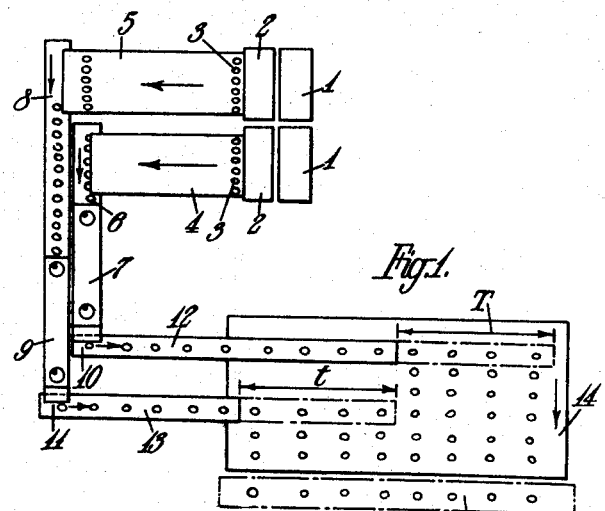
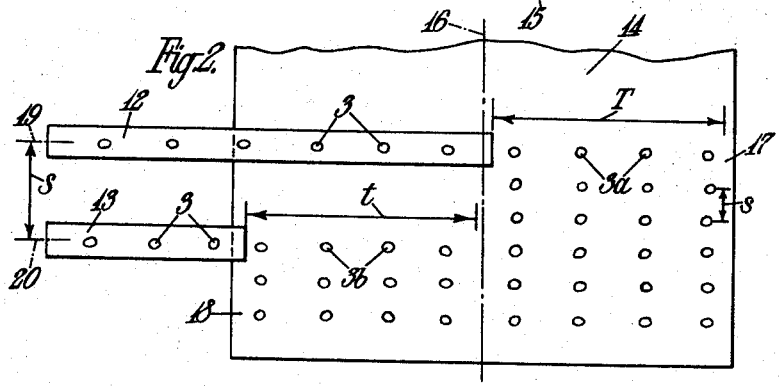
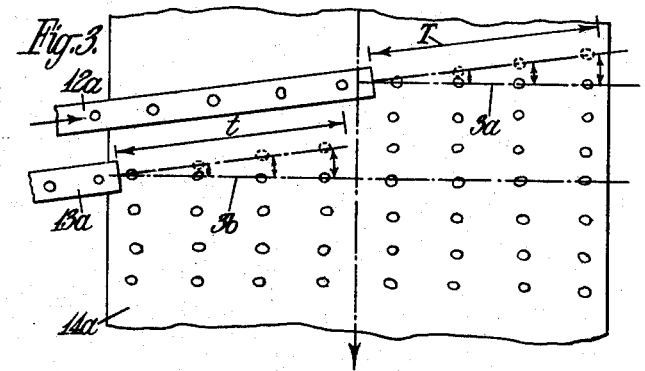
INVENTOR
DAVID KING BAKER
BY
ATTORNEYS

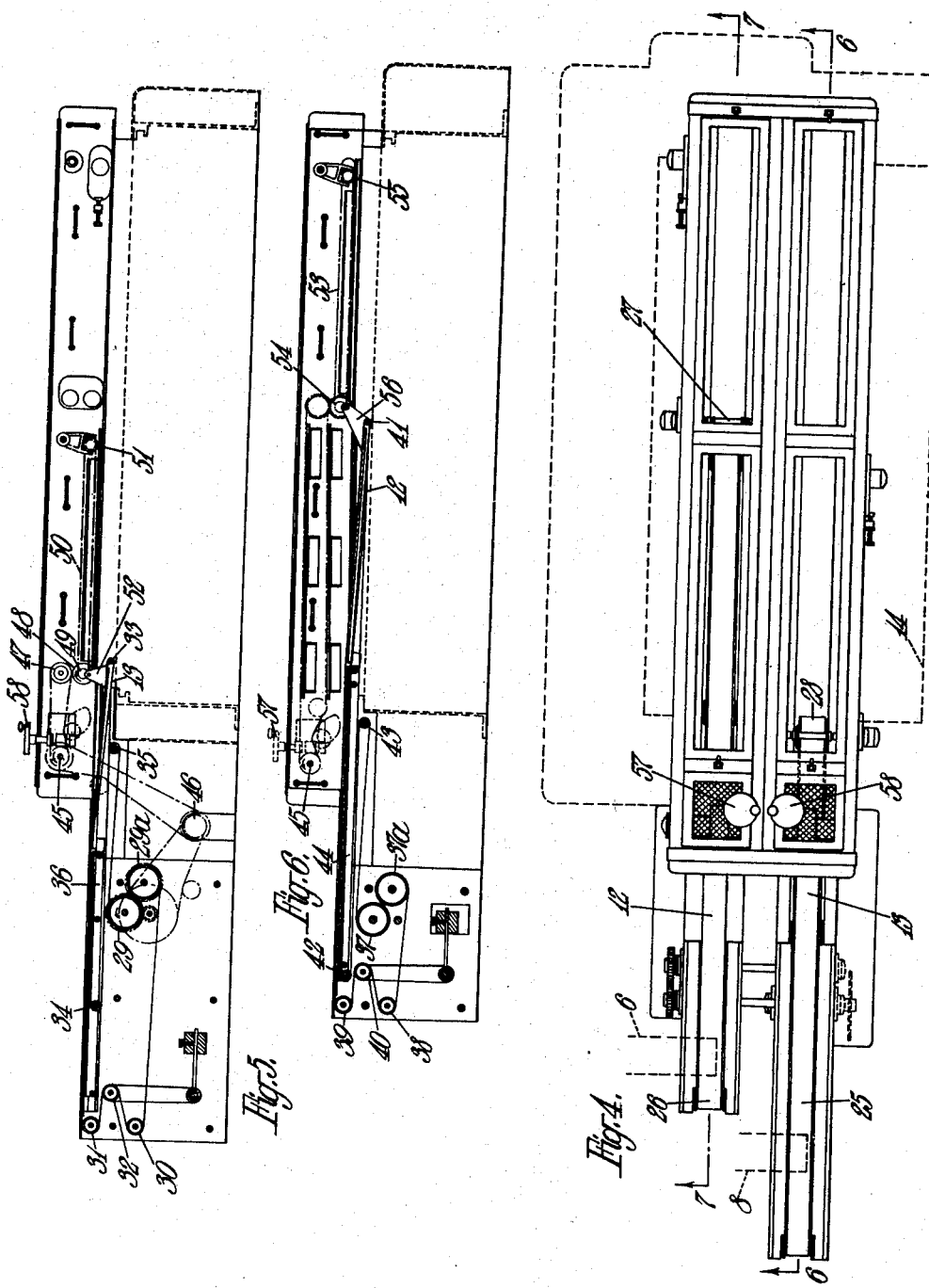

United States Patent Office 3,106,280
Patented Oct. 8, 1963

3,106,280
TRANSFER OF ARTICLES BETWEEN MOVING CONVEYOR MEANS
David King Baker, Peterborough, England, assignor to Baker Perkins Incorporated, Saginaw, Mich.
Filed Dec. 2, 1959, Ser. No. 856,779
Claims priority, application Great Britain Dec. 5, 1958
1 Claim. (Cl. 198—30)

This invention relates to apparatus for transferring articles to moving surface conveyor means so that the articles are disposed on the conveyor means in rows extending across the conveyor means, the transfer apparatus being of the type referred to as "peeling conveyors" in which an endless band passes around a terminal nose which reciprocates over the surface on to which the articles are to be transferred so that on a forward stroke of the peeling conveyor the articles are carried over the surface and on a rearward stroke the conveyor peels from beneath the articles and so deposits them on the surface.

It is an object of the present invention to provide an improved apparatus of the "peeling conveyor" type for transferring articles to moving surface conveyor means quickly and accurately, particularly where the moving conveyor means surface is wide, for example in the region of four feet or over.

The invention has particular utility in the transfer of divided, moulded and/or shaped dough pieces to a broad conveyor, on which the dough pieces are aligned in parallel rows, feeding further plant such as the trays of a prover, and by use of transfer apparatus, according to the present invention, the output of two or more dough dividers can be delivered to the broad conveyor quickly and accurately while maintaining the proper alignment and spacing of the dough pieces in rows thereon.

The invention consists in apparatus for transferring articles to moving surface receiving conveyor means (hereinafter referred to as the "receiving conveyor") to deposit the articles thereon in alignment in rows extending across the receiving conveyor, comprising two or more endless band conveyors of the "peeling" type (hereinafter referred to as "peeling conveyors") disposed in side-by-side parallelism so as to extend transversely of the direction of movement of the receiving conveyor and so as to reciprocate thereover, the peeling strokes of the peeling conveyors being simultaneous and adapted such that each peeling conveyor transfers its articles to a different transverse portion of the receiving conveyor so that together the full effective width of the receiving conveyor is spanned, and the rate or character of the forward movement of the receiving conveyor being in timed relation to the peeling strokes of the peeling conveyors such that articles transferred by the peeling conveyors to the different transverse portions of the receiving conveyor finally form aligned rows extending fully across the width of the receiving conveyor and disposed at right angles to the direction of movement of the receiving conveyor. By this arrangement each peeling operation of the peeling conveyors transfers the articles to the receiving conveyor in staggered row portions across the receiving conveyor, but the forward movement of the receiving conveyor is such that the succeeding stroke or strokes of the peeling conveyors transfer further row portions of articles to complete each row of articles fully across the effective width of the receiving conveyor.

Thus, according to one form of the invention, the peeling conveyors are disposed to reciprocate at right angles to the direction of movement of the receiving conveyor and the latter moves stepwise such that the length of each drive step is equal to the desired spacing between rows of articles on the receiving conveyor and is an integral factor of the distance apart of the centre lines of the peeling conveyors. For example, where the desired inter-row spacing is 5 inches, each drive step of the receiving conveyor is 5 inches and the spacing apart of the centre line of the peeling conveyors is a convenient multiple of 5, say 15 inches; in such a case, assuming two peeling conveyors, the inter-row spacing and the drive step are both a third of the distance apart of the peeling conveyors, so that while a full row of articles will be completed on each stroke of the peeling conveyors (after the initial start) the last row portion to be deposited in each row will complete the row the start portion of which was deposited four strokes earlier.

According to an alternative form of the invention, the receiving conveyor is continuously moving and the peeling conveyors are disposed to reciprocate oblique to the direction of movement of the receiving conveyor, the rate of travel and the obliquity of the peeling conveyors being so arranged with respect to the rate of travel of the receiving conveyor, that the articles are deposited from the peeling conveyors in row portions extending at right angles to the direction of movement of the receiving conveyor.

According to a further alternative form of the invention, the receiving conveyor is continuously moving and the peeling conveyors are disposed to reciprocate at right angles to the direction of movement of the receiving conveyor while being mounted such that the delivery ends of the peeling conveyor move with the surface of the receiving conveyor, e.g. by mounting the peeling conveyors to swing about vertical axes, during each peeling stroke and for movement back to their starting position during their forward stroke.

In the accompanying drawings:

FIGURE 1 is a diagrammatic plan of part of a bakery plant for the automatic production of bread rolls showing transfer conveyor means according to the present invention, FIGURE 2 is a plan diagram showing the operation of the transfer conveyor means according to the present invention when used in conjunction with a receiving conveyor which is driven stepwise, FIGURE 3 is a plan diagram showing the operation of the transfer conveyor means according to the present invention when used in conjunction with a receiving conveyor which is continuously driven, FIGURE 4 is a plan view of one form of transfer conveyor means according to the present invention, and FIGURES 5 and 6 are sectional side elevations taken respectively on the line 6—6 and 7—7 of FIGURE 4.

An automatic bakery plant for the production of bread rolls may include an arrangement such as shown diagrammatically in FIGURE 1, wherein a pair of dough dividers 1 each feed a moulder 2 to produce dough pieces 3 in aligned rows on broad conveyors 4 and 5. The broad conveyor 4 delivers the dough pieces 3 thereon to a narrow cross conveyor 6 on which the dough pieces are carried to a shaper 7 of known character. The broad conveyor 5 delivers the dough pieces 3 thereon to a narrow cross conveyor 8 which also carries the dough pieces to a shaper 9 of known character.

After passing through the shapers 7 and 9 the dough pieces are carried by the narrow conveyors 4 and 5 to transfer points 10 and 11 whereat they are transferred to the transfer conveyor means, according to the present invention, which comprise a long peeling conveyor 12 and a short peeling conveyor 13 which extend in the diriction of, and arranged to reciprocate, as described hereafter, over, a broad receiving conveyor 14 to deposit the dough pieces in aligned parallel rows thereon. The broad receiving conveyor 14 then transfers the dough pieces row by row to prover trays, one of which is indicated at 15.

The peeling operation of the long and short peeling conveyors 12 and 13 will now be described with reference to FIGURES 2 and 3, of which FIGURE 2 represents diagrammatically the operation of the peeling conveyors 12 and 13 with a stepwise driven receiving conveyor 14, and FIGURE 3 represents diagrammatically the operation of peeling conveyors 12a and 13a with a continuously driven receiving conveyor 14a.

In the arrangement shown in FIGURE 2, the peeling conveyors 12 and 13 are parallel to one another and are set at right angles to the axis 16 of the receiving conveyor 14. The long peeling conveyor 12 has a throw T which extends from the far side 17 of the receiving conveyors to about the central axis 16 of the receiving conveyor and transfers the dough pieces 3 thereon to the farther portion of the surface of the receiving conveyor 14 to form a half row of dough pieces 3a, referred to as the far row portion 3a. The short peeling conveyor 13 has a throw t which extends from about the central axis 16 of the receiving conveyor 14 to the near side 18 thereof and transfers the dough pieces 3 thereon to the nearest portion of the surface of the receiving conveyor 14 to form the second half row of dough pieces 3b, referred to as the near row portion 3b.

The spacing S between the axes 19 and 20 of the long and short peeling conveyors 12 and 13 is an integral multiple of the spacing s between adjacent rows of dough pieces on the receiving conveyor 14, the spacing s being as required or governed by subsequent operations and the timing of the subsequent operation and the timing of the subsequent plant as a whole. Thus, as shown in FIGURE 2, the spacing S between the peeling conveyors 12 and 13 is 3 times s so that each near row portion 3b of a dough piece row is transferred three row spacing s ahead of the simultaneously deposited far row portion 3a which latter row portion will not be completed up to full row length until the third transfer operation of the short peeling conveyor 13 after the far row portion 3a was deposited. In practice the centre line to centre line spacing of the peeling conveyors 12 and 13 is kept to a minimum to ensure adequate utilisation of the surface area of the receiving conveyor 14.

As soon as the peeling conveyors 12 and 13 have deposited their respective row portions 3a and 3b, the receiving conveyor is moved forward one step which is equal in distance to the selected inter-row spacing s between adjacent rows. The peeling conveyors 12 and 13 then operate again and the short peeling conveyor 13 transfers a near row portion 3b to complete a previously laid far row portion 3a so that the complete row extends across the width of the receiving conveyor 14, which the long peeling conveyor 12 transfers a new far row portion 3a to be subsequently completed (three peels later) by the short peeling conveyor 13.

Thus (after the first three peeling operations of a new run), each peeling stroke of the short peeling conveyor 13 results in the formation of one complete row across the width of the receiving conveyor 14 which row is then moved forward on the receiving conveyor 14 towards a delivery point stepwise as the receiving conveyor is moved. During each stepwise forward movement of the receiving conveyor 14, the peeling conveyors 12 and 13 undergo their forward stroke which repositions them over the receiving conveyor surface ready for their next peeling strokes.

By arranging the axes of the peeling conveyors 12 and 13 at an angle to the axis of the receiving conveyor 14 (or by mounting the peeling conveyors each on vertical pivot means so that their delivery ends move with the surface of the receiving conveyor), the receiving conveyor 14 may be continuously moving as opposed to stepwise as described above.

In FIGURE 3 there is shown diagrammatically the operation of peeling conveyors 12a and 13a set at an inclination to the axis of the receiving conveyor 14a, which latter is continuously driven at a constant surface speed. The two peeling conveyors 12a and 13a reciprocate as previously described with their respective throws of T and t. Due, however to the inclination of the peeling conveyors and the surface of the conveyor 14a moving continuosly during transfer of the dough pieces from the peeling conveyors to the receiving conveyors, the dough pieces are still caused to be laid in straight line rows at right angles to the receiving conveyor axis. In FIGURE 3 the dough pieces shown in dotted lines represent the position of each dough piece at the moment of transfer and the short arrows show the movement which each dough piece has made by the time the last dough piece of either the far row portion 3a or the near row portion 3b has been transferred.

In carrying the invention into effect according to one mode by way of example, see FIGURES 4 to 6, the long and short peeling conveyors 12 and 13 are mounted in parallelism of a framework, the peeling conveyor 13 having an extension 25 projecting beyond the end 26 of the peeling conveyor 12 to permit delivery access to the peeling conveyors by the narrow feed conveyors 6 and 8 from the shapers and moulders referred to previously with reference to FIGURE 1. Beneath the reciprocating paths of the noses 27 and 28 of the long and short peeling conveyors 12 and 13, the position of the receiving conveyor 14 is indicated by dotted lines in FIGURE 4.

Each peeling conveyor 12 and 13 is of conventional design insofar as their drive, take-up bights, tensioning and turning points are concerned, so they will not be described in detail. Briefly, however, the short peeling conveyor 13, see FIGURE 5, has a pair of nip driving rolls 29, 29a, turning point rolls 30 and 31 with an intervening weight-loaded tensioning roll 32, a nose 33 and bight-forming take-up rolls 34 and 35, of which the roll 34 is carried on the same reciprocating framework 36 as the nose 33 and the roll 35 is mounted on the machine structure. The long peeling conveyor 12, see FIGURE 6, has a pair of nip driving rolls 37, 37a, turning point rolls 38 and 39 with an intervening weight-loaded tensioning roll 40, a nose 41, and bight-forming take-up rolls 42 and 43, of which the roll 42 is carried on the same reciprocating framework 44 as the nose 41 and the roll 43 is mounted on the machine structure.

To provide the reciprocatory drive for each peeling conveyor 12 and 13, a common lay shaft 45 is driven from the main machine drive, indicated at 46. For the reciprocatory drive to the short peeling conveyor 13, the drive from the layshaft 45 is taken to a gear 47 meshing with a gear 48 carrying a co-axial sprocket wheel 49. An endless chain 50 is trained round the sprocket wheel 49 and round a return sprocket wheel 51 spaced along the reciprocatory path by a distance substantially equal to t (FIGURES 1 and 2), the throw of the short peeling conveyor. The reciprocatory framework 36 of the short peeling conveyor 13 has, adjacent the nose 33, a bracket 52 pivotally connected to the chain 50 such that as the chain 50 travels round its circuit between the sprocket wheels 49 and 51 the framework 36 reciprocates to provide the peeling and return strokes to the short peeling conveyor 13. The lower lap of the chain circuit carrying the nose 33 rearwards at low level on the peeling stroke and the upper lap carrying the nose 33 forwards at a raised level on the return stroke.

The drive to the long peeling conveyor 12 is substantially the same in that the layshaft 45 drives an endless chain 53 between sprocket wheels 54 and 55 spaced apart by a distance substantially equal to T (FIGURES 1 and 2) and the reciprocating framework 44 of the long peeling conveyor 12 has, adjacent its nose 41, a bracket 56 which is pivotally connected to the chain 53, the drive operating similarly to and simultaneously with the drive from the short peeling conveyor 13.

Manual adjustment means, indicated at 57 and 58 are provided for independent adjustment of the nose positions of the long and short peeling conveyors 12 and 13.

The main machine drive 46 is responsible for the reciprocatory movement of the noses 33 and 41 of the peeling conveyors 13 and 12 and also for the drive of the peeling conveyor surfaces themselves. Additionally the receiving conveyor 14 may be driven from the same source, intermittently step-wise in the case of the peeling conveyors arranged at right angles thereto as shown in FIGURE 4 or continuously if the peeling conveyors are arranged at an inclination as described with reference to FIGURE 3.

I claim:

Article transfer apparatus comprising article receiving conveyor means; means for continuously driving said conveyor means along a path; first delivery conveyor means having a movable, article supporting surface terminating in a discharge end; means supporting said delivery conveyor means adjacent said receiving conveyor means with said article supporting surface of said delivery conveyor means extending obliquely laterally of the path of movement of said receiving conveyor means; means for cyclically lengthening and shortening said article supporting surface of said delivery conveyor means by an amount such that said discharge end traverses a portion only of the lateral dimension of said receiving conveyor means; second delivery conveyor means having a movable, article supporting surface terminating in a discharge end; means mounting said second delivery conveyor means substantially parallel to said first delivery means but spaced from the latter along the path of movement of said receiving conveyor means; means for cyclically lengthening and shortening the article supporting surface of said second delivery conveyor means by an amount such that its said discharge end traverses the remaining portion of the lateral dimension of said receiving conveyor means; and means for driving the lengthening and shortening means of each of said delivery conveyor means at such speed with relation to the speed at which said receiving conveyor means is driven that articles delivered to said receiving conveyor means by the delivery conveyor means that is downpath from the other delivery conveyor means are laterally aligned with the articles delivered to said receiving conveyor means by said other delivery conveyor means.

References Cited in the file of this patent

UNITED STATES PATENTS

| 941,296 | Baker | Nov. 23, 1909 |
| 1,764,153 | Cramer | June 17, 1930 |
| 2,909,267 | Ferguson | Oct. 20, 1959 |

FOREIGN PATENTS

| 392,947 | Germany | Mar. 27, 1924 |